(12) United States Patent
McManus et al.

(10) Patent No.: US 7,639,843 B2
(45) Date of Patent: Dec. 29, 2009

(54) LEGEND INCLUDING TRANSPARENT ZONE

(75) Inventors: Thomas McManus, Plymouth, MN (US); Peter Bergstrom, St. Paul, MN (US)

(73) Assignee: Fluke Corporation, Everett, WA (US)

( * ) Notice: Subject to any disclaimer, the term of this patent is extended or adjusted under 35 U.S.C. 154(b) by 694 days.

(21) Appl. No.: 11/458,556

(22) Filed: Jul. 19, 2006

(65) Prior Publication Data
US 2008/0019572 A1 Jan. 24, 2008

(51) Int. Cl.
*G06K 9/00* (2006.01)
*H04N 5/33* (2006.01)
*G01J 5/00* (2006.01)

(52) U.S. Cl. .............. 382/113; 348/164; 250/338.1

(58) Field of Classification Search ............. 382/100, 382/113, 162, 163, 164, 165, 166, 167; 348/33, 348/144, 164, 169; 250/230, 330, 332, 338.1, 250/339.8, 339.11, 342, 495.13; 702/23, 702/76, 129, 135; 725/126; 356/308, 326; 341/23

See application file for complete search history.

(56) References Cited

U.S. PATENT DOCUMENTS

| | | | |
|---|---|---|---|
| 4,023,201 A | 5/1977 | Faulkner | |
| 4,139,862 A | 2/1979 | Haskell et al. | |
| 4,214,164 A | 7/1980 | Traub et al. | |
| 4,806,723 A | 2/1989 | Beynon et al. | |
| 5,572,312 A | 11/1996 | Karlsson et al. | |
| 5,818,951 A | 10/1998 | Schivley | |
| 5,878,356 A * | 3/1999 | Garrot et al. ............. | 701/1 |
| 6,104,298 A | 8/2000 | Flanders | |
| 6,288,396 B1 | 9/2001 | Qiang et al. | |
| 6,356,646 B1 | 3/2002 | Spencer | |
| 6,606,115 B1* | 8/2003 | Alicandro et al. ........ | 348/164 |
| 6,653,939 B2 | 11/2003 | Galloway | |
| 6,766,226 B2 | 7/2004 | Andersen | |
| 6,798,587 B2* | 9/2004 | Irani ..................... | 359/809 |
| 6,953,932 B2* | 10/2005 | Anderson et al. ........ | 250/338.1 |
| 2002/0109096 A1 | 8/2002 | Carter | |
| 2004/0196372 A1 | 10/2004 | Lannestedt | |
| 2005/0089076 A1 | 4/2005 | Lindstrom et al. | |

FOREIGN PATENT DOCUMENTS

| | | |
|---|---|---|
| WO | WO 02/104010 | 12/2002 |
| WO | WO 03/076884 | 9/2003 |
| WO | WO 2006/020869 | 2/2006 |

OTHER PUBLICATIONS

IR Flexcam Family User Manual, from Infrared Solutions, Inc., Documents No. 105127, Rev. B, 03.06.

* cited by examiner

*Primary Examiner*—Abolfazl Tabatabai
(74) *Attorney, Agent, or Firm*—Fredrikson & Byron, P.A.

(57) ABSTRACT

A legend overlaid on a composite image includes at least one zone, corresponding to a coded portion of the image, and at least one other zone, which is transparent, corresponding to an un-coded portion of the image.

24 Claims, 7 Drawing Sheets

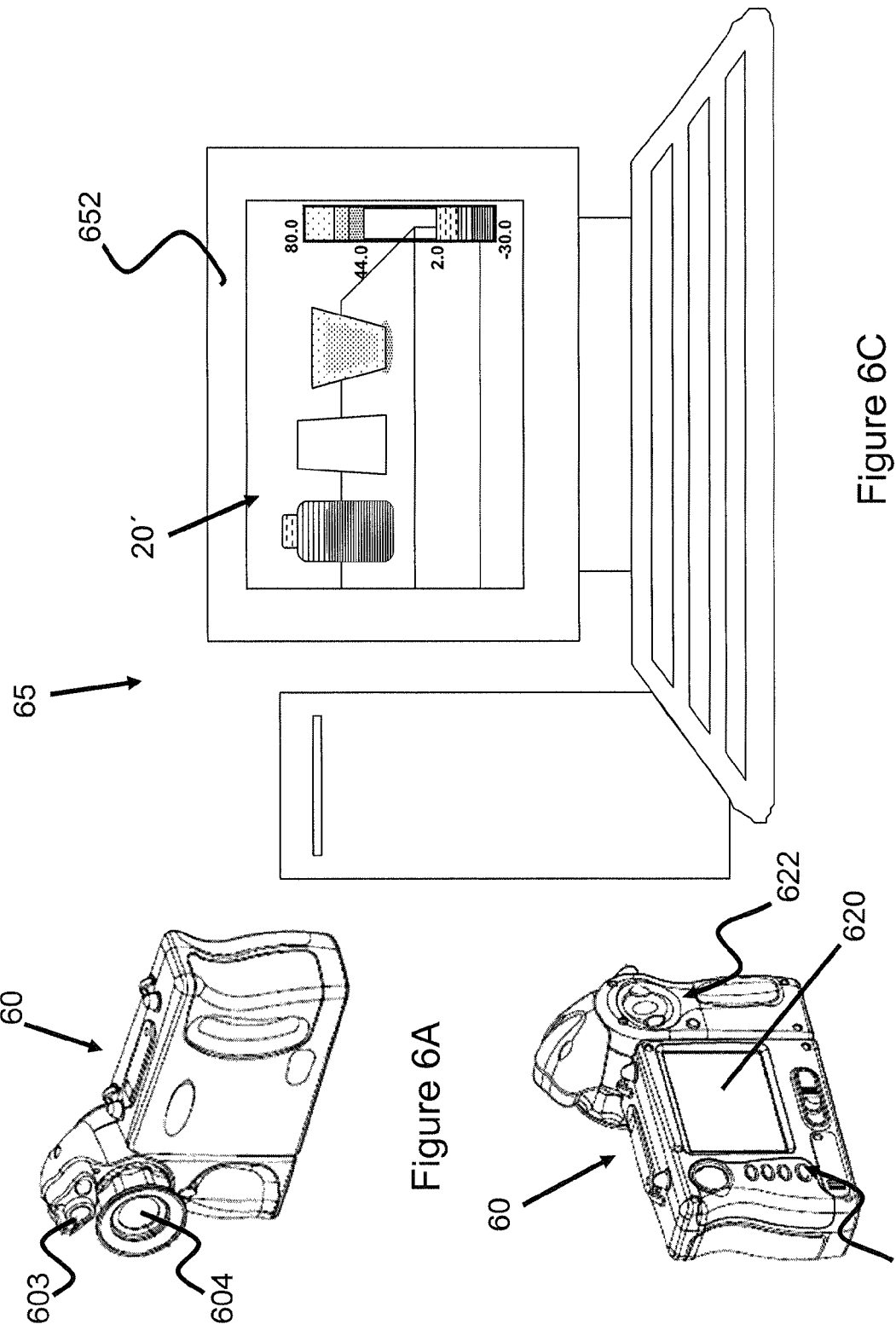

LEGEND INCLUDING TRANSPARENT ZONE

TECHNICAL FIELD

The present invention relates to legends for interpreting coded images and more particularly to the presentation of these legends overlaid upon the images.

BACKGROUND

In many technical fields the visible light spectrum is used to color code images in order to provide for a quick visual analysis, for example, of elevation, stress, strain, or temperature variation over an object or objects captured in the image. The spectrum of colors, as a qualitative scale of values, is calibrated to a quantitative scale of values, such that each color corresponds to a particular numeric value, or range of numeric values, within the overall range of the scale. A legend for interpreting such an image, typically including a color bar having the spectrum of colors aligned along the scale of quantitative values, is often overlaid on the coded image. In some cases, shades of gray or assorted patterns or textures may be substituted for the spectrum of colors as a qualitative scale of values.

In certain instances, an analyst of these coded images will want to focus their attention to particular areas of the image where quantitative values associated with the image (either measured or calculated) are within a targeted range. To facilitate this more focused analysis, either the overall range of the scale for coding the image may be decreased from that originally established, or portions of the originally established range may be 'turned off', that is, the colors (or shades of gray) associated with the portions of the range that are not of interest are removed from the image. A resulting image will have at least two portions: a first that is coded, and a second that is un-coded and merely presents a visible outline or structure of the captured object(s), which may, or may not, be absent of any color; such an image is referred to herein as a composite image. Manipulating the range, as such, is enabled by state-of-the-art computer software programs, and may be performed while the analyst views the image on a computer monitor or screen.

Turning off particular portions of the overall range, rather than decreasing the overall range, provides more flexibility, for example, by allowing the analyst to pick a plurality of discrete non-adjacent portions of the range to remain coded on the image. In addition, maintaining the same overall range provides some uniformity in color coding over multiple analyses, wherein a different discrete range has been selected for each analysis. One example of a type of analysis that uses composite images is a temperature profile analysis of an object or scene captured by an infrared camera. One example of an infrared camera system having the capability to display and capture composite images for analysis is the IR FLEX-CAM® system including SmartView® software, available from Infrared Solutions, Inc.—a Fluke Company. This system creates a composite image of an object or scene in which infrared scale colors, i.e. colors arranged according to the visible light spectrum and calibrated to a selected temperature scale using radiometric techniques, are superimposed over visible light colors; the system further provides a "color alarm mode" that allows a user of the system to select one or more temperature ranges of interest so that only the visible light portion of the object or scene is displayed for those parts of the image that are not within the selected ranges. This color alarm mode is described in co-pending and commonly-assigned U.S. patent application Ser. No. 11/294,752, entitled, VISIBLE LIGHT AND COMBINED IMAGE CAMERA WITH A LASER POINTER, which is hereby incorporated by reference, in its entirety.

When viewing a composite image, for example, wherein one or more discrete ranges of values, within an overall range of values, have been selected for coding, it may be difficult to quickly determine exactly what ranges have been selected. Thus, there is a need for a type of legend that can facilitate intuitive interpretation of composite images.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIGS. 6A-B are perspective views of an exemplary infrared camera included in a system according to some embodiments of the present invention.

FIG. 6C is a schematic representation of an exemplary computer included in a system according to some embodiments of the present invention.

Due to the limitations imposed on patent application drawings with respect to color, and for the purpose of clarity in reproduction, a qualitative scale of values used in FIGS. 1A-5 and 6C employs various patterns rather than the more typical colors of the spectrum of visible light. It should be noted that the scope of the present invention is not limited to any particular type of scale of qualitative values, nor to a particular resolution thereof.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention.

Figure 1A:
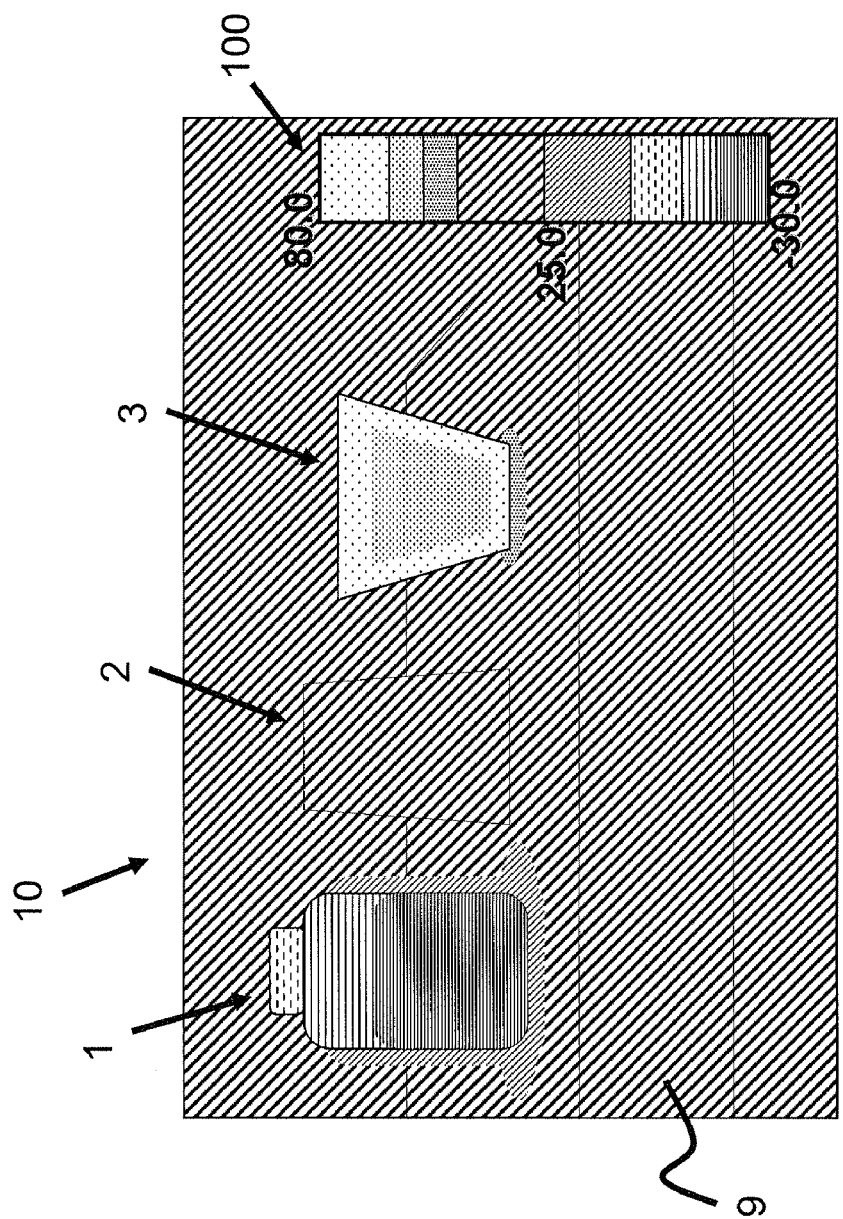
FIG. 1A is a schematic representation of a completely coded image, of an exemplary scene or group of objects, having a corresponding legend overlaid thereon.
Figure 1B:
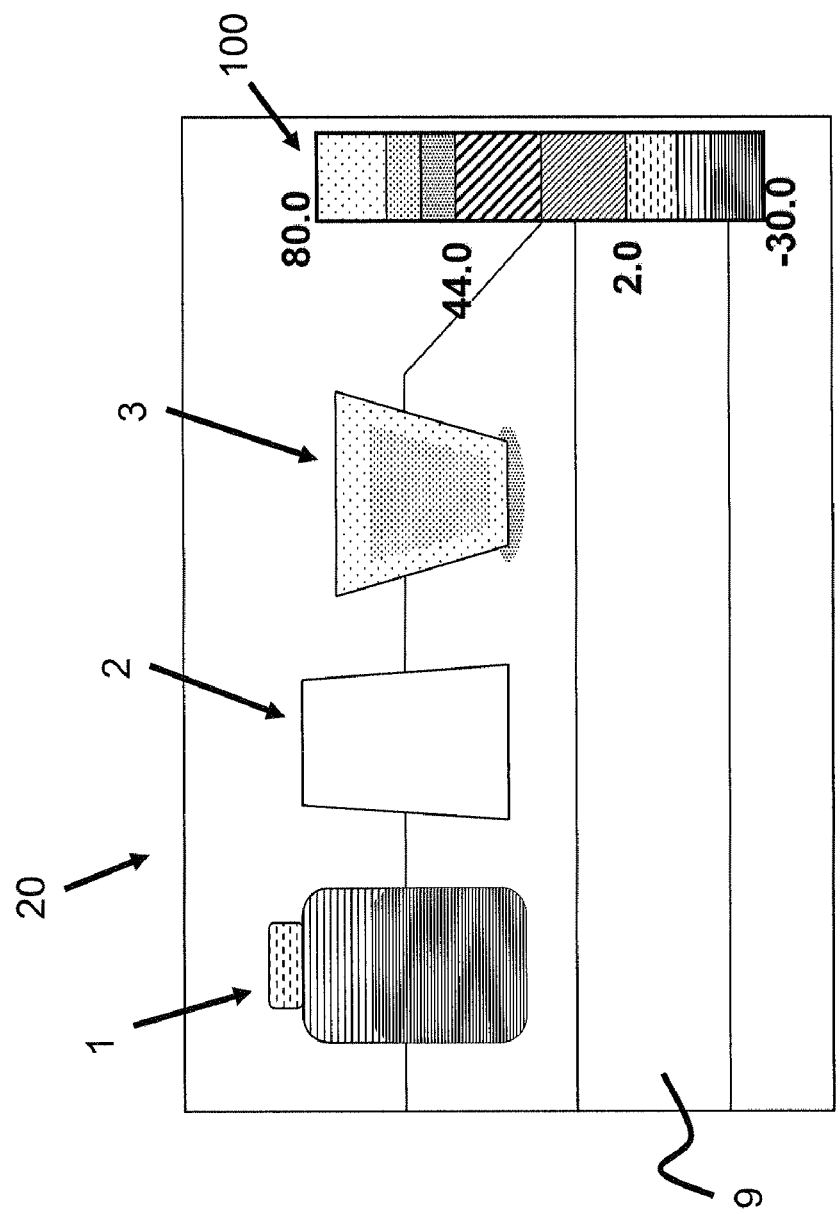
FIG. 1B is a schematic representation of a composite image of the scene, having the legend overlaid thereon.

FIG. 1A is schematic representation of a completely coded image 10, of an exemplary scene or group of objects 1, 2, 3 and 9, having a corresponding legend 100 overlaid thereon. Image 10 may have been generated by an infrared camera system, for example, as depicted in FIGS. 6A-C, and, as such, FIG. 1 illustrates a scene having a temperature profile spanning a quantitative scale of values that ranges from approximately −30° C. to approximately 80° C. By referencing legend 100, in which a scale of qualitative values, represented by various patterns, is calibrated to the quantitative values, a viewer, or analyst of image 10 may determine that object 1 is relatively cold compared to an ambient temperature of the scene, that objects 2 and 9 are approximately at ambient temperature, and that object 3 is relatively warm compared to the ambient temperature. Upon further analysis, the viewer/analyst of image 10 may be able to quantify a temperature gradient across object 1, which ranges from approximately −30° C. up to a temperature below approximately 25° C., and a temperature gradient across object 3, which ranges from approximately 80° C. down to a temperature above 25° C. Because image 10 is completely coded, some details of the scene are obscured, and this may make it difficult for a viewer/analyst to gain a frame of reference for the objects in the scene. Additionally, a viewer/analyst, who would like to target, or focus in on, particular areas of the scene, for example, either a "hot spot" or a "cold spot", may be distracted by the entirety of image 10 being coded. The scene captured in image 10 (and subsequent images 20-50 of FIGS. 1B-5) is relatively simple, but one can imagine that a more complex image depicting, for example, a circuit board or electronic control panel, may be quite difficult to quickly interpret if the image is completely coded.

FIG. 1B is a schematic representation of a composite image 20 of the scene, having the legend 100 overlaid thereon. FIG. 1B illustrates image 20 including a coded portion, corresponding to the relatively high and low temperatures of objects 1 and 3, as previously described, and an un-coded portion, corresponding to the ambient temperature range, wherein visible outlines representing the structure of objects 2 and 9 can be seen, for example, via a visible light display. With reference to FIG. 1B, it may be appreciated that an analyst has selected display parameters such that only the "hot" and "cold" areas are shown, thereby making it less difficult to understand the context of the scene in which these areas are found. However, because legend 100 includes the entire scale of qualitative values, another analyst or viewer of image 20 may need to spend some extra time studying legend 100 in order to determine the exact temperatures ranges of the coded portion of image 20.

FIGS. 2-5 are schematic representations of composite images 20', 30, 40 and 50, respectively, of the scene, having corresponding legends 200, 300, 400 and 500 overlaid thereon, according to embodiments of the present invention. Each composite image 20'-50 is shown including a coded portion displayed with values from the qualitative scale of values, previously introduced in conjunction with FIGS. 1A-B (shown along legend 100), and an un-coded portion. The coded portion of each image 20'-50 may be interpreted by referencing one or more zones of the corresponding legend 200-500. The un-coded portion of each image 20'-50 merely presents visible detail or structure of objects 2, 9 (FIG. 2), objects 1, 2, and 9 (FIG. 3), objects 2, 3 and 9 (FIG. 4), and objects 1, 2 and 3 (FIG. 5), which, in the context of an infrared camera system, may be displayed with visible light, for example, a photograph, but could be a computer-generated representation of the structure of each object in the context of another type of system. According to the illustrated embodiment, each of legends 200, 300, 400 and 500 includes at least one transparent zone 220 (FIG. 2), 312 (FIG. 3), 423 (FIG. 4), and 530 and 510 (FIG. 5), respectively, spanning a range of quantitative values corresponding to the un-coded portion of the corresponding image 20'-50. The transparent zones allow visualization, through the legend, of overlaid portions of the image, and, in combination with the qualitatively-scaled zones of the legend, provide for an intuitive display, of selected and non-selected quantitative ranges that correspond to coded and non-coded portions, respectively, of the image.

Figure 2:
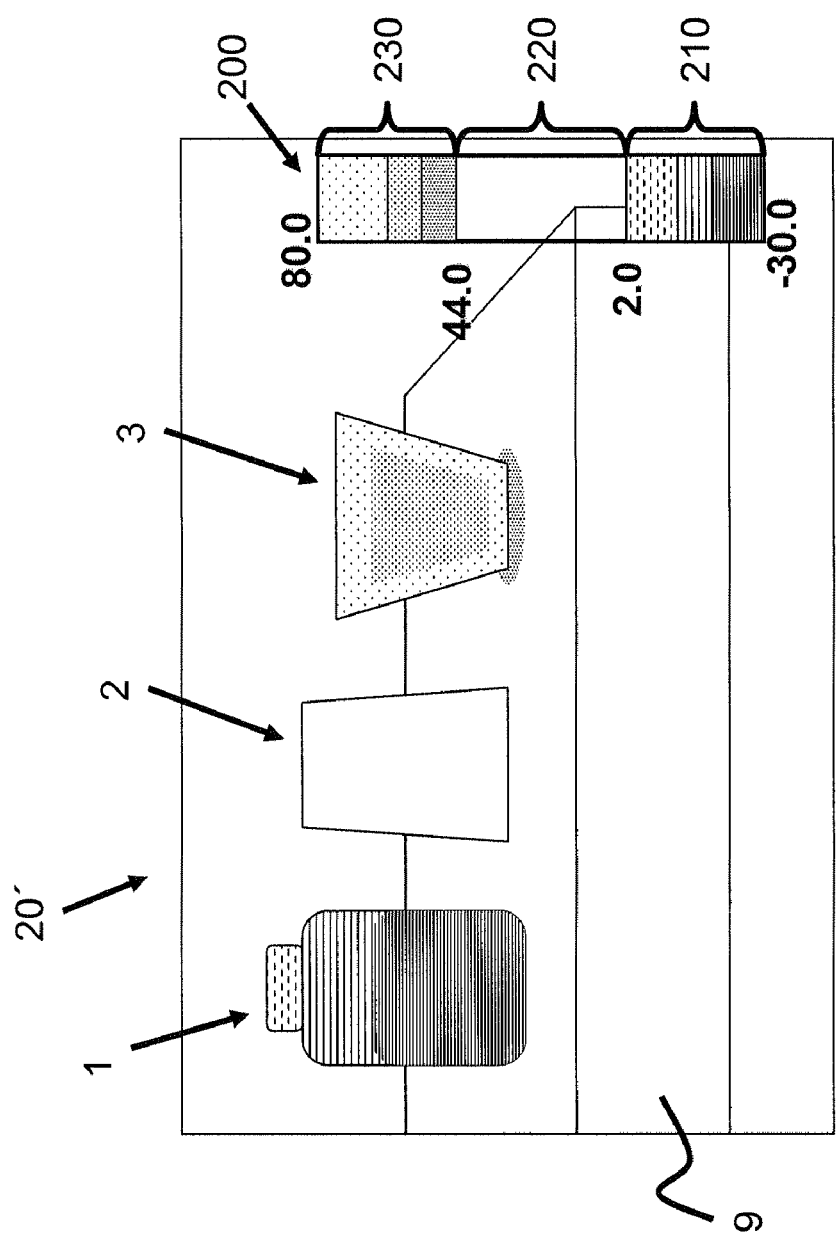
FIGS. 2-5 are schematic representations of various composite images of the scene, having corresponding legends overlaid thereon, according to embodiments of the present invention.

With reference to FIG. 2, legend 200 includes a zone 210, which has a qualitative range of values corresponding to a first part of a coded portion of image 20', for example, object 1, and which, according to the numbers shown indexing zone 210, spans a quantitative range of approximately −30° C. to approximately 2° C.; legend 200 further includes a zone 230, which has a qualitative range of values corresponding to a second part of the coded portion of image 20', for example, object 3, and which, according to the numbers shown indexing zone 230, spans a quantitative range of approximately 44° C. to approximately 80° C. It may be readily appreciated that, with a quick reference to the numbers indexing transparent zone 220 of legend 200, the remaining objects 2 and 9, as well as the background of image 20', are each either outside the overall temperature range defined by legend 200, or are within a temperature zone between approximately 2° C. and approximately 44° C. Although the illustrated embodiments include the numbers indexing each zone, embodiments of the present invention need not include any or all of these numbers as an operator may readily perceive the quantitative range of one or more of the zones of each legend from the relative positions of the zones along each legend. According to some interactive embodiments of the present invention, indexing numbers appear on the image when a cursor is positioned over a legend of the image, and are otherwise not shown in the image.

Figure 3:
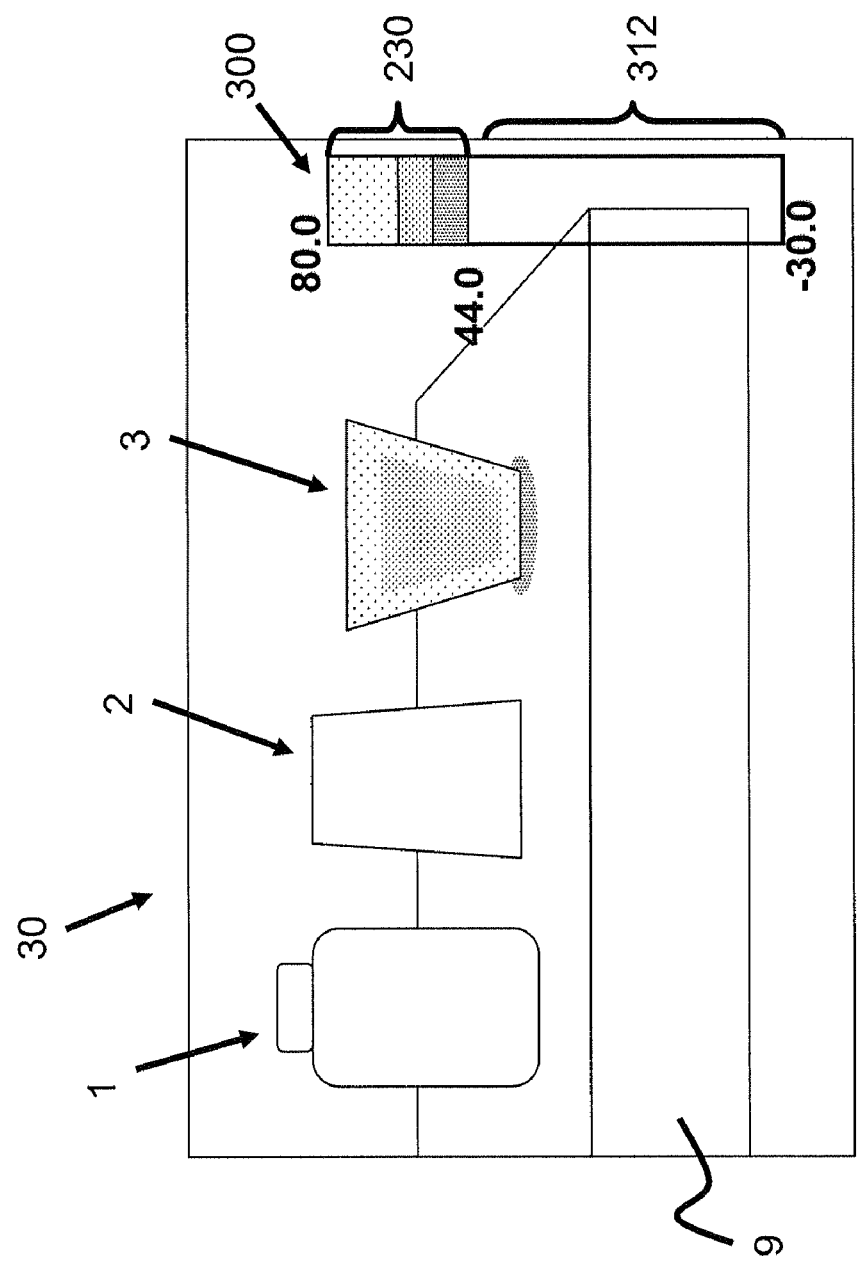
Figure 4:
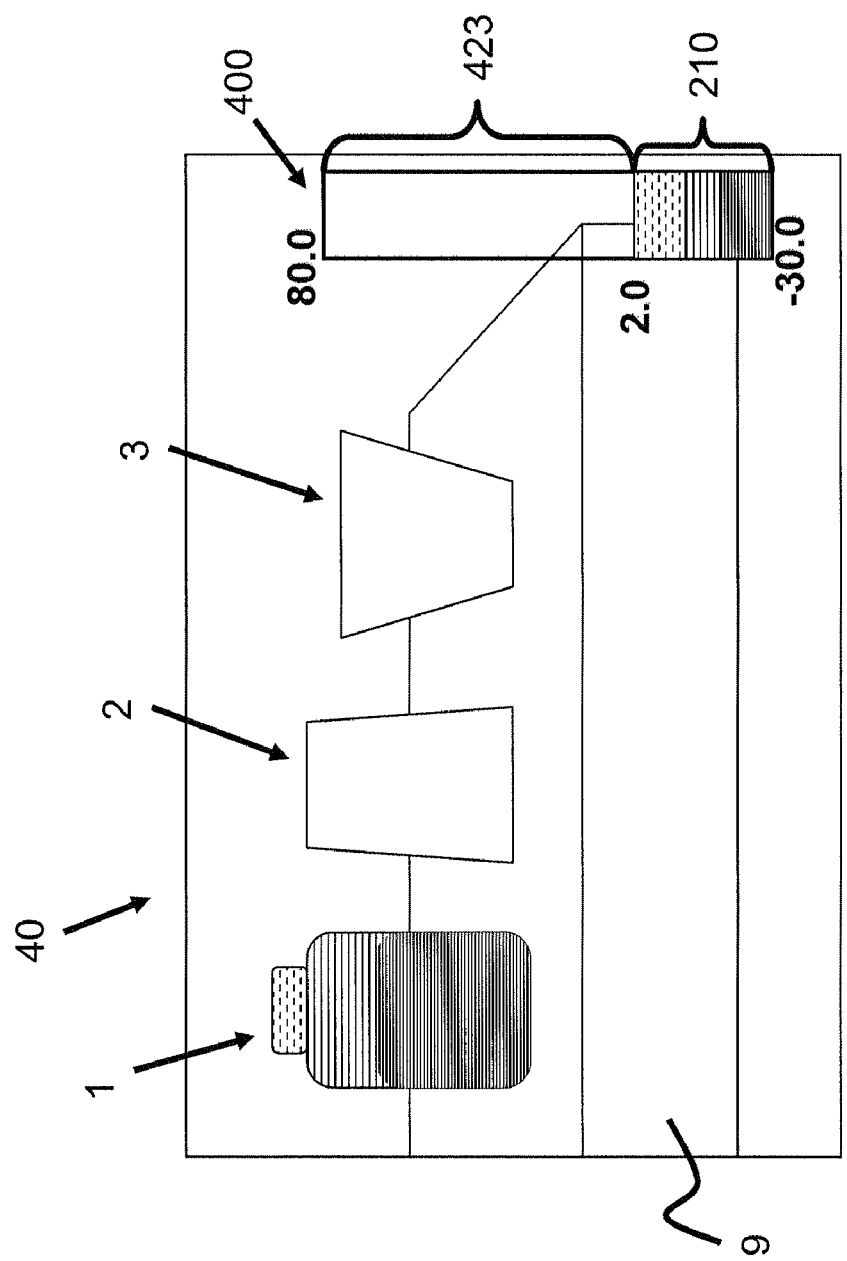

With reference to FIG. 3, legend 300 includes zone 230, as described in conjunction with FIG. 2, and transparent zone 312 that spans a temperature zone from approximately −30° C. to approximately 44° C. Thus, with a quick reference to legend 300, it may be appreciated that object 3 has a temperature profile within the range of zone 230, while the temperature profile of the rest of image 30 lies outside that range. Conversely, FIG. 4 shows image 40 wherein legend 400 includes the previously described zone 210, along with transparent zone 423, which spans a temperature range from approximately 2° C. to approximately 80° C. Thus, with a quick reference to legend 400, it may be appreciated that object 1 has a temperature profile within the range of zone 210.

Figure 5:
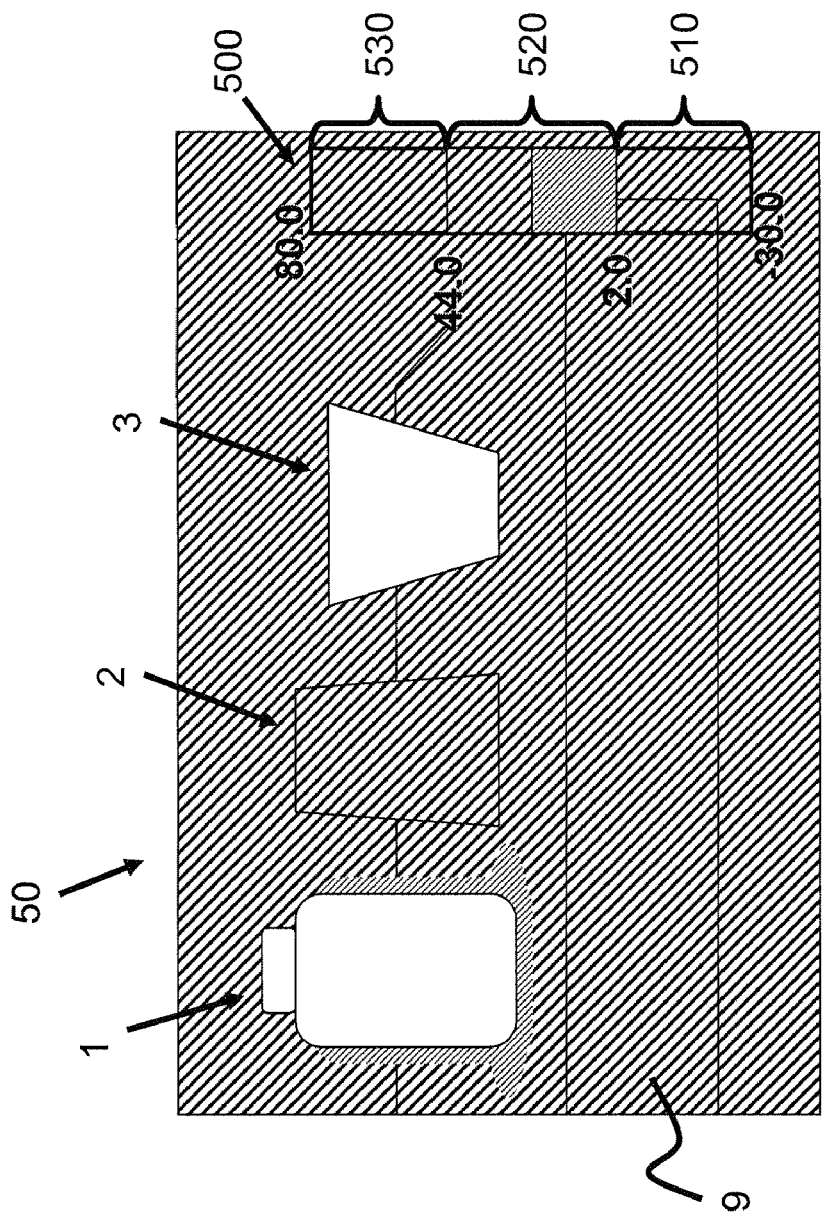

With reference to FIG. 5, legend 500 includes a zone 520, which has a qualitative range of values corresponding to a coded portion of image 50, for example, objects 2 and 9 and the background of the scene, and which, according to the numbers indexing zone 520, spans a quantitative range from approximately 2° C. to approximately 44° C. FIG. 5 further illustrates legend 500 including a first transparent zone 510, which spans a temperature range from approximately −30° C. to approximately 2° C., and a second transparent zone 530, which spans a temperature range from approximately 44° C. to approximately 80° C. Thus, with a quick reference to legend 400, it can be appreciated that objects 2 and 9 and the background of image 50 have a temperature profile within the range of zone 520, while the temperature profile of objects 1 and 3 lie outside that range.

FIGS. 6A-B are perspective views of an exemplary infrared camera 60 included in a system according to some embodiments of the present invention. FIGS. 6A-B illustrate camera 60 including both an infrared lens 604 and a visible-light lens 603. Thus, camera 60 has the capacity to generate blended, or composite, images, for example, as illustrated in FIGS. 1B-5, and to display these images on a screen 620, which is shown along a backside of camera 60 in FIG. 6B. FIG. 6B further illustrates various user controls 622, which may be used to, among other functions, select temperature ranges for infrared coloring, or coding, of captured images. Exemplary embodiments of this type of camera are described in previously-referenced, co-pending and commonly-assigned U.S. patent application Ser. No. 11/294,752.

FIG. 6C is schematic representation of an exemplary computer 65 included in a system according to some embodiments of the present invention. FIG. 6C illustrates computer 65 including a monitor 652 on which image 20 is displayed.

According to certain embodiments of the present invention, all of the information of a captured scene, for example, as shown in the previously illustrated images 10-50, may be transferred from camera 60, either via a cable connection (not shown) or wirelessly, to computer 65 for further analysis, wherein image 20 is generated on monitor 652 according to a selection of temperature ranges (i.e., −30° C.-2° C. and 44° C.-80° C.); the selected ranges correspond to the coded portion of image 20, and are displayed in the legend (i.e., on either side of the transparent zone). Of course, legends of the present invention may also be incorporated by images created on computer 65 by mathematical modeling of the scene, or of any other type of structure or physical phenomena, or from data/measurements collected by other types devices.

In the foregoing detailed description, the invention has been described with reference to specific embodiments. However, it may be appreciated that various modifications and changes can be made without departing from the scope of the invention as set forth in the appended claims. For example, embodiments and methods of the present invention are described in the context of an infrared camera system and associated temperature profile analysis, but it is contemplated that any type of analytical system that has the capacity to generate composite images of objects, as described herein, either by mathematical calculation, or by direct measurement and collection methods, or by a combination thereof, may incorporate embodiments and methods of the present invention.

The invention claimed is:

1. A system programmed to execute a method for presenting a legend for interpreting a composite image generated by the system, the composite image comprising a first portion displayed with values from a qualitative scale of values that is calibrated to a quantitative scale of values, and a second portion displayed with visible light, and the method comprising:
   displaying a first zone of the legend such that the first zone spans a first quantitative range within the quantitative scale of values and has a qualitative range of values from the qualitative scale of values, the qualitative range corresponding to the first quantitative range, and the first zone corresponding to the first portion of the image; and
   displaying a second zone of the legend such that the second zone spans a second quantitative range within the quantitative scale of values and is transparent, the second zone corresponding to the second portion of the image;
   wherein the composite image and the legend are displayed on a graphical user interface of the system, the legend being overlaid upon the image; and
   a part of the image that is overlaid by the second zone is visible.

2. The system of claim 1, wherein the first and second quantitative ranges include measured values.

3. The system of claim 1, wherein the first and second quantitative ranges include calculated values.

4. The system of claim 1, wherein the quantitative scale of values defines temperatures.

5. The system of claim 1, wherein the qualitative scale of values comprises infrared scale colors and the quantitative scale of values defines temperatures.

6. The system of claim 1, wherein the method further comprises displaying a third zone of the legend such that the third zone spans a third quantitative range within the quantitative scale of values and has a qualitative range of values from the of qualitative scale of values, different from that of the first zone, the qualitative range of the third zone corresponding to the third quantitative range, and the third zone corresponding to the first portion of the image.

7. The system of claim 1, wherein:
   the method further comprises displaying a third zone of the legend such that the third zone spans a third quantitative range within the quantitative scale of values and is transparent, the third zone corresponding to the second portion of the image; and
   a part of the image that is overlaid by the third zone is visible.

8. The system of claim 1, wherein the method further comprises displaying numbers indexing the first zone of the legend.

9. The system of claim 1, wherein the method further comprises displaying numbers indexing the second zone of the legend.

10. The system of claim 1, wherein the system comprises an infrared camera and the graphical user interface comprises a display screen of the camera.

11. A method for interpreting a composite image, the composite image being displayed through a graphical user interface and comprising a first portion displayed with values from a qualitative scale of values that is calibrated to a quantitative scale of values, and a second portion displayed with visible light, the method being executed by a user of a system that generates the composite image and includes the graphical user interface, the method comprising:
   identifying a first range of quantitative values associated with the first portion of the image by viewing a first zone of a legend overlaid on the image being displayed through a graphical user interface, the first zone corresponding to the first portion of the image and spanning the first range of quantitative values, the first zone having a qualitative range of values; and
   identifying a second range of quantitative values associated with the second portion of the image by viewing a second zone of the legend being displayed through a graphical user interface, the second zone corresponding to the second portion of the image and spanning the second range of quantitative values, the second zone being transparent, such that a part of the image overlaid by the second zone is visible.

12. The method of claim 11, further comprising identifying a third range of quantitative values associated with the first portion of the image by viewing a third zone of the legend, the third zone corresponding to the first portion of the image and spanning the third range of quantitative values, and the third zone having a qualitative range of values, different from that of the first zone.

13. The method of claim 11, further comprising identifying a third range of quantitative values associated with the second portion of the image by viewing a third zone of the legend, the third zone corresponding to the second portion and spanning the third range of quantitative values, and the third zone being transparent, such that a part of the image overlaid by the third zone is visible.

14. The method of claim 11, wherein the system comprises an infrared camera.

15. A legend apparatus displayed through a graphical user interface the interface also displaying a composite image for analysis via the legend apparatus, the composite image comprising a coded portion and an un-coded portion, the coded portion displayed with values from a qualitative scale of values that is calibrated to a quantitative scale of values, the legend apparatus being overlaid on the composite image and comprising:

a first zone corresponding to the coded portion of the image and spanning a first quantitative range within the quantitative scale of values;

the first zone having a qualitative range of values from the qualitative scale of values, the qualitative range corresponding to the first quantitative range; and a second zone corresponding to the un-coded portion of the image and spanning a second quantitative range within the quantitative scale of values, the second zone being transparent, such that a part of the image overlaid by the second zone is visible.

16. The legend apparatus of claim 15, wherein the first and second quantitative ranges include measured values.

17. The legend apparatus of claim 15, wherein the first and second quantitative ranges include calculated values.

18. The legend apparatus of claim 15, wherein the quantitative scale of values define temperatures.

19. The legend apparatus of claim 15, further comprising:
a third zone, the third zone corresponding to the coded portion of the image and spanning a third quantitative range within the quantitative scale of values;

wherein the third zone has a qualitative range of values from the qualitative scale of values, different from that of the first zone, and corresponding to the third quantitative range.

20. The legend apparatus of claim 15, further comprising:
a third zone, the third zone corresponding to the un-coded portion of the image and spanning a third quantitative range within the quantitative scale of values;

wherein the third zone is transparent, such that a part of the image overlaid by the third zone is visible.

21. The legend apparatus of claim 15, further comprising numbers indexing the first zone.

22. The legend apparatus of claim 15, further comprising numbers indexing the second zone.

23. The legend apparatus of claim 15, wherein the qualitative scale of values comprises infrared scale colors and the quantitative scale of values defines temperatures.

24. The legend apparatus of claim 15, wherein the un-coded portion of the image is displayed with visible light.

* * * * *